June 10, 1941.  P. E. MILLER ET AL  2,245,545
SURFACE TREATING TOOL
Filed May 9, 1939   3 Sheets-Sheet 3
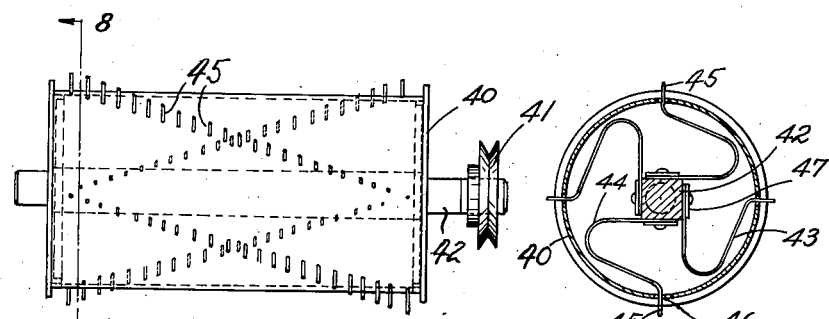
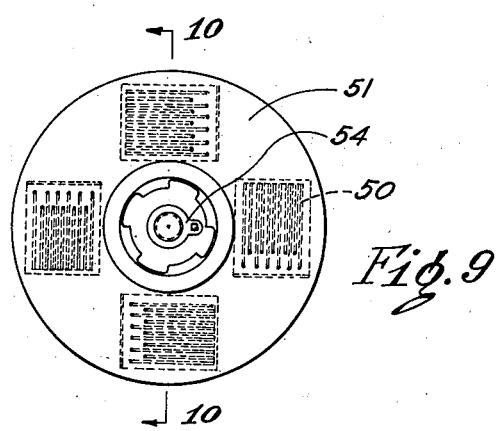
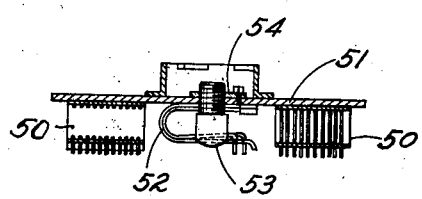
INVENTORS:
Perry E. Miller,
Wilbur C. Sauer,
Charles C. Howe.
BY Hawgood & Van Horn
Their ATTORNEYS.

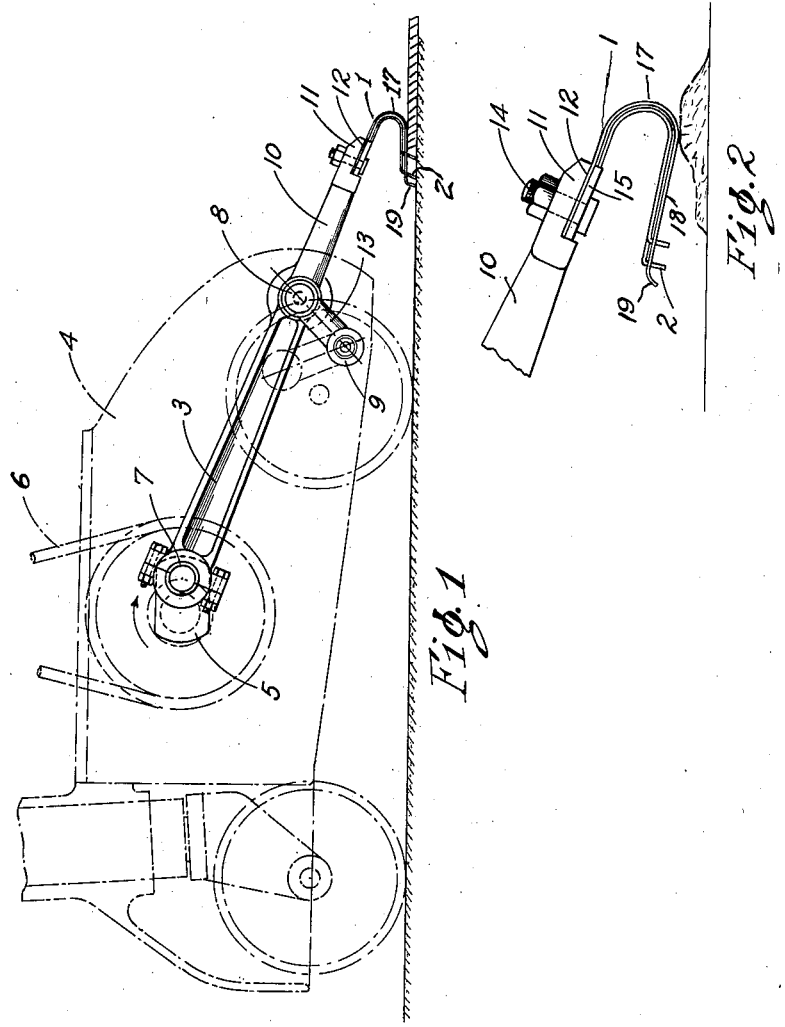

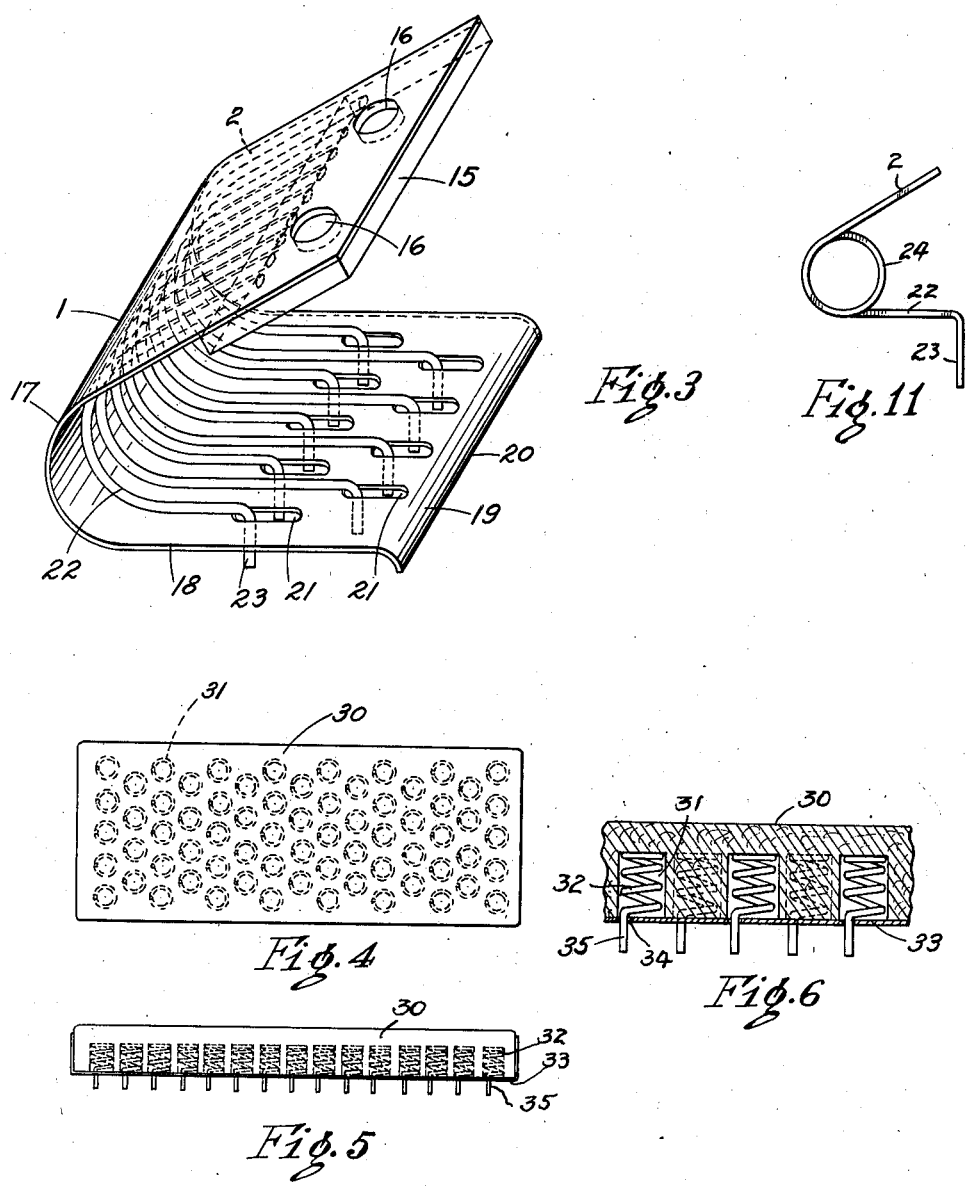

Patented June 10, 1941

2,245,545

UNITED STATES PATENT OFFICE 2,245,545

SURFACE TREATING TOOL

Perry E. Miller, Cleveland Heights, Wilbur C. Sauer, Dover Center, and Charles C. Hower, Cleveland, Ohio; said Sauer and said Hower assignors to said Miller Application May 9, 1939, Serial No. 272,648

7 Claims. (Cl. 15—93)

Our invention is an improvement in surface treating tools and relates more particularly to a driven cutter, brush or the like for use in removing, cleansing or roughening or scarifying a surface or for removing hard uneven accumulation of foreign matter from a floor or wall.

It is one of the objects of our invention to provide a tool of this character which comprises a semi-flexible shield and a cutter associated therewith, said tool being detachably secured to a driven member.

Another object is to provide a cutter having a plurality of independently flexible blades which during the cutting stroke tend to conform to any unevenness of the under surface in any direction and to provide means to prevent breakage of the cutter when encountering obstacles beyond the capacity of the cutter.

A further object is to provide a cutter which will automatically adjust the cutting depth at each stroke whereby the capacity of the cutter will not be exceeded.

Another object is to provide a shield for the blades of a cutter tool of the type described which serves to automatically lift the individual blades when contacting a surface higher than the cutting capacity of the tool.

A still further object is to provide a surface cutting machine having a plurality of cutter units which can be actuated at higher speeds without danger of injury to the blades.

Another object of the invention is to provide a driven surface treating tool including a shield substantially U-shaped in cross section to provide a semi-flexible condition and a plurality of individually flexible cutter blades housed within the shield and operating through the same.

Another object of the invention resides in the provision of a surface cutter having a plurality of independently flexible blades, said unit being adapted for use preferably on a driven member having either a rotary or linear direction of motion.

A further object of the invention consists in providing a tool of this type which is of simple construction yet sturdy and efficient in use.

A still further object is a cutting or scraping tool in which the blades or cutters are protected against injury when obstructions on a surface or uneven surfaces are encountered.

Another object of the invention is to provide, in a tool of this type, a means for cutting or removing a surface and removing and throwing forward all loosened particles of the surface as the tool progresses along the surface.

A further object is to provide cutter blades in the form of U-shaped rods in which the curvature tends to equalize and modify the cutting strains and flexure over the greater length of each individual rod, thereby minimizing any tendency of the rods to crystallize or take a permanent set.

Another object and advantage of our invention is that by virtue of the construction thereof the cutters are independently flexed and thereby snap in return to their normal position with the result that they free themselves of all clinging particles.

Other objects and advantages of our invention will become more apparent from the following description of several embodiments thereof, reference being made to the accompanying drawings in which like reference characters are employed to designate like parts throughout the same.

In the drawings:

Figure 1 is a side elevation of one form of our invention shown applied in use;

Figure 2 is an enlarged fragmental view of the tool shown in Figure 1 and illustrates the position of the same when an obstruction on the surface is encountered;

Figure 3 is an enlarged perspective view of the tool shown in Figures 1 and 2;

Figure 4 illustrates a second embodiment of the invention in plan view. This form may be used manually as a brush;

Figure 5 is a side elevation of the form shown in Figure 4;

Figure 6 is a fragmentary sectional detail of the form shown in Figure 5;

Figure 7 is a front elevation of another form of the invention and illustrates the same applied to a driven roller or cylinder;

Figure 8 is an end view of the device shown in Figure 7;

Figure 9 is another form of the invention and shows the same applied to a rotary head or disk;

Figure 10 is a section taken on line 10—10 of Figure 9; and

Figure 11 is a detail of an alternative form of cutter blade.

Referring now first to Figures 1 to 3 inclusive, we will first describe the form of the invention illustrated therein.

In carrying out this embodiment of the invention the tool comprises essentially an outer semi-flexible shell or shield 1 which is formed of sheet metal into substantial U-shape in cross section, and a plurality of cutters or blades 2 carried by and housed within the shield.

The shield and cutter elements when assembled provide a tool unit which may be detachably secured to a driven member. In these figures we have shown the same applied to reciprocating and rocking power driven cutter bar 3. The machine is illustrated generally in Figure 1 and includes an ambulant body 4 having a crank shaft 5 driven by any suitable means, such as a belt or chain 6. A plurality of cutter bars 3 are driven by the crank shaft when the latter is rotated.

As illustrated in Figure 1, the cutter bar shown is pivoted to the crank arm at 7 and to a link at 8. The other end of the link 13 is pivoted at 9 to the body 4.

The cutter bars 3 extend forwardly of the machine and downwardly thereof in a direction toward the surface to be treated and terminate at the forward ends 10 in a head 11 recessed at 12 to receive the cutter units.

It will be observed from Figure 1 that as the crank shaft is rotated, the forward end of each cutter bar will describe a path which is partially ovoidal in a vertical plane.

This is due to the provision of the link 13 and the driving connection between the cutter bar and the crank shaft. The stroke of the forward end of the cutter bar may be described briefly as first approaching the surface to be treated in a downwardly and forward direction, then following through in an upwardly motion and returning on an arc which will enable the tool to clear the surface to be treated and return to a position where the cycle can be repeated.

The invention relates primarily to a type of cutting or surface treating tool 1 which is adapted to be detachably secured to the forward recessed end of each of the cutter bars by means of one or more bolts and nuts 14 passing through the recessed end 11 of the cutter bar and through the holder 15 for the shield 1 and cutter rods or blades 2.

Referring now more particularly to Figure 3, we will proceed to describe in detail the construction of one form of cutter tool which comprises this embodiment of our invention. The tool primarily consists of a shield which is formed of semi-flexible sheet metal of suitable gauge and stiffness and which is substantially U-shaped in cross section. The upper end of the tool is formed with a support or head 15 which is provided for the purpose of clamping the upper ends of the individual cutter rods or blades 2 within the shield and for stiffening the upper end of the tool in the area where it is secured to the cutter bar. The member 15 may comprise a block of metal of suitable thickness which is welded or otherwise secured to the shield 1 and blades 2 as shown in Figure 3, there being provided one or more bolt holes 16 passing through the same.

The unit is detachably secured to the cutter bar 10 by means of bolts and nuts 14.

The U-shaped shield 1 is formed on its forward portion with a rounded nose 17 which is provided not only for the purpose of imparting a semi-flexible condition to the shield, but also to engage obstacles on the surface to be treated and to absorb a large portion of the shock occasioned by such engagement. The lower portion 18 of the shield lies in a substantially horizontal plane and terminates at its rear end in a downwardly turned flange 19 which may be toothed if desired, providing a scraper 20 extending across the entire width of the tool. The lower horizontal portion of the shield is provided with one or more series of slots 21 and where a plurality of such series is provided, such as shown in Figure 3, it is desirable to have the slots in each series alternated or staggered with the slots in adjacent series.

The cutter members carried by the shield comprise a plurality of individually flexible wire rods or blades 2 which are nested within the shield as indicated at 22 in Figure 3, their upper ends being securely anchored between the shield and the adjacent portion of the head 15. These cutting members are shaped to the contour of the shield and lie within the same, their lower ends being bent downwardly as at 23 to operate through the respective slots 21. The downwardly bent ends 23 normally extend below a horizontal plane passing through the scraper edge 20.

By alternating the cutting blades it is possible to provide for greater efficiency in the tool and thereby increase the cutting action per unit on the surface to be treated. Furthermore this arrangement permits only a few of the blades to strike the surface to be removed, the remaining blades following in the same fashion. In this manner the action is such that the cutting thrust is modified and permits of a more complete or greater cutting action.

Furthermore, by such construction the particles liberated by the cutting action will be of smaller size and will be more readily disposed of by the forward action of the scraper 20. The normal position of the cutter members 22 is as shown in Fig. 3, but these members being individually flexible, are free to flex upwardly within the slots and into the shield 1, when the occasion demands.

It will also be noted that the slots 21 are elongated and serve as guides for the down turned ends or blades 23 of the cutter members 22 and further support these rods or blades against side thrusts directing their action primarily to the direction of the movement of the unit as a whole. The shield 1 protects the blades 23 against injury and further serves to automatically raise the blades when an obstruction is encountered which is of sufficient height above the floor level to unduly tax the capacity of the tool.

As the tool moves downwardly and forwardly in engagement with the surface, the teeth 23 will individually impinge upon the surface to be treated and cut the same into relatively small particles during the movement of the tool. As these particles are loosened, continued forward motion of the tool will permit the scraper 20 to thrust these particles forwardly and clear of the tool.

Also, due to the fact that the cutter blades are individually flexible in the slots 21, the tool possesses the characteristic of being self-cleaning.

In Figure 11 we have shown a slightly modified form of cutter member which differs only from the form already described in that the cutter is formed with an intermediate loop 24. By virtue of this loop fatigue and excessive shock in the member is substantially eliminated, thus making replacements due to breakage much less frequent. For this reason it is perhaps more desirable to employ this form of cutter member in preference to the form shown in Figure 3.

Referring now more particularly to Figures 4, 5, and 6, we have illustrated a modification of the invention, which in the present illustration, may be used as a brush or other manually operated surface tool. In this modification the body of the tool is indicated at 30 and comprises a block of suitable size for convenience of use, there being alternate series of sockets or receptacles 31 formed upwardly in the under surface of the block to receive the cutting members 32.

The cutting members each comprise a helically wound metal wire of suitable stiffness, and diameter, yet possessing sufficient flexibility for the purpose desired.

These coils are adapted to be seated within the sockets 31 and are maintained therein by means of a retaining plate 33. The retaining plate is provided with series of properly spaced holes 34 through which the downwardly extending teeth or bristles 35 of the coils extend. The teeth or bristles are guided by the holes in the plate 33 and are reinforced against any movement except that in the direction of the axis of the respective coils.

While this type of construction may be used manually, it also may be made up into units which can be assembled in a scrubbing machine.

In Figures 7 and 8 we have illustrated another form of the invention in which we have applied the principle to a rotary type of holder 40, which is driven by means of a suitable power connection to the pulley 41. To the central shaft 42 which is preferably polygonal in cross section, but is twisted to spiral form, we have shown attached a plurality of resilient cutters 43. These cutters are of the form somewhat similar to those shown at 22 in Figure 3, they being U-shaped in side elevation and being provided with an intermediate portion to impart flexibility thereto as at 44 and with prongs or teeth 45 adapted to project through suitable openings 46 in the cylindrical body 40. A series of these cutters may be assembled along each flat side of the spirally formed shaft and may be clamped thereto by means of a plate or the like 47. In this form of the invention as the cylinder rotates along the surface to be treated, the spiral arrangement of the cutters projecting through the cylinder will effect a progressive sweeping cutting action across the surface over which the cylinder progresses, as well as forwardly thereof, somewhat in the nature of the blades of a lawn mower.

In Figures 9 and 10 we have illustrated another form of the invention which is essentially the same as that shown in Figure 3, but which has been applied to a rotary head such as is commonly used on scrubbing machines and the like. The units illustrated at 50 may be applied to the head or disk 51, by means of bolts or other detachable means, and are preferably arranged so that when power is applied to rotate the disk, the rounded or nose portion 52 of the unit will lead.

In this form of the invention the construction need not differ from that form shown in Figure 3, although the top portion of the shield more nearly approaches a plane which is near the lower portion of the shield for this type of use.

In order that the depth of cut may be regulated in using this embodiment of the invention an adjustable stop 53 is threaded through the head from the bottom side and is rounded on its lower end for engagement with the surface to be treated. This member may be adjusted vertically by means of the locking member 54 which may be loosened during the adjustment, but thereafter tightened to hold the stop or stud 53 in the adjusted position.

Our invention therefore, possesses many novel features which contribute to produce a device which is efficient and effective in use and economic of manufacture.

The driven cutter will operate very satisfactorily to remove a surface even though that surface be uneven or rough and without injury to the cutter units. By virtue of the construction employed the shield 1 provides a means for carrying and protecting the blades and guides them vertically. The shield also serves to raise the cutters and the scraper when contacting a surface higher than one which comes within the cutting capacity of the tool. Furthermore, the construction permits the blades to be automatically adjusted to the proper cutting depth of each stroke.

Our invention also permits the cutter units to be driven at much higher speeds than is possible with other types of driven surface cutters of this class.

Various changes in the details of construction and arrangement of parts may be made without departing from the spirit of our invention or the scope of the appended claims.

We claim:

1. A surface treating tool comprising a holder substantially U-shaped in cross section to impart a limited degree of flexibility to the holder and a plurality of individually flexible cutters secured in said holder, an arm of said holder having openings therein to receive the ends of the cutters individually operating therethrough.

2. A surface treating tool comprising a holder substantially U-shaped in cross section to impart a limited degree of flexibility to the holder and a plurality of individually flexible cutters secured in said holder, an arm of said holder having openings therein to receive the ends of the cutters individually operating therethrough, said holder arm having its free transverse edge turned downwardly to provide a scraping edge for the tool.

3. A cutting tool comprising a plurality of individually flexible cutting members and a semi-flexible support for said members, said support being shaped to the contour of said cutters and having a plurality of elongated openings therein, said cutters having portions projecting downwardly through said openings for contact with the surface to be treated.

4. In a machine for treating surfaces such as floors and the like, a power driven member and a surface treating tool detachably secured to said power driven member, said tool comprising a plurality of individually flexible cutters and a semi-flexible shield for housing said cutters, said shield having openings adjacent the ends of the individual cutters for receiving said cutter ends.

5. In a machine for treating surfaces such as floors or the like, a power driven cutter bar, means to operate said bar in a path describing a substantial ovoid in a vertical plane, and a tool carried by said bar, said tool including a semi-flexible member formed of sheet metal and having a substantially U-shaped cross-section, a portion of said member being formed into a scraping edge along its rear end.

6. In a machine for treating surfaces such as floors or the like, a power driven cutter bar, means to operate said bar in a path describing a substantial ovoid in a vertical plane, and a tool carried by said bar, said tool including a semi-flexible member formed of sheet metal and having a substantially U-shaped cross section, a portion of said member being formed into a scraping edge along its rear end, and a plurality of individually flexible cutter members carried by said shield and projecting therethrough to engage the surface to be treated.

7. In a cutting tool, a substantially flexible U-shaped shield having openings in one of its arms, a plurality of individually tensioned cutting members carried within the shield and normally in contact with the inner surface of the shield, the ends of the cutters projecting through said openings in the shield, said shield arm raising said cutters when flexed toward its other arm.

PERRY E. MILLER.
WILBUR C. SAUER.
CHARLES C. HOWER.